F. J. YOUNG.
ACCELERATING DEVICE FOR MOTOR CARS.
APPLICATION FILED FEB. 21, 1920.
1,375,436.
Patented Apr. 19, 1921.
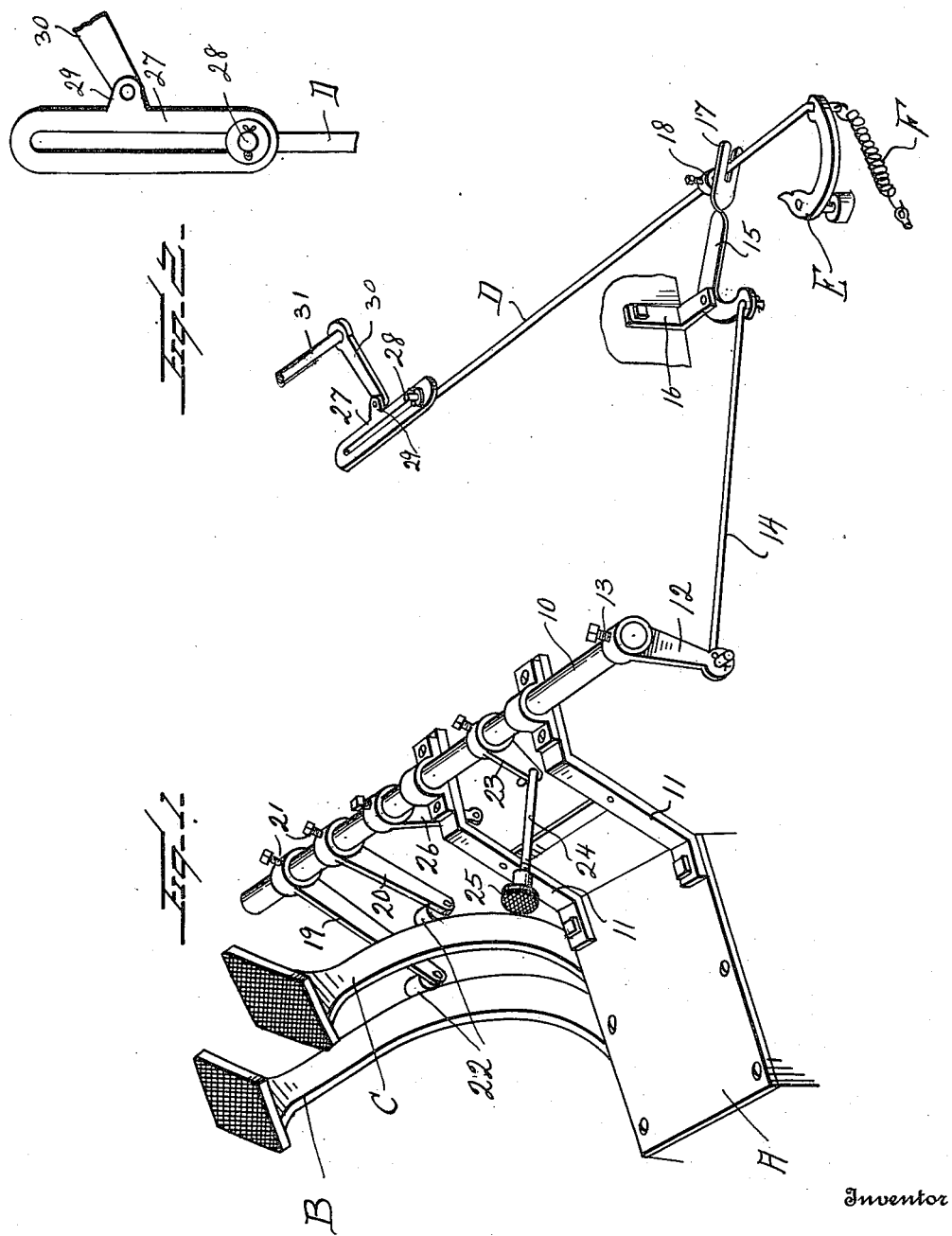

UNITED STATES PATENT OFFICE.

FAY J. YOUNG, OF WAYLAND, NEW YORK, ASSIGNOR OF ONE-HALF TO JOHN KIEL, OF WAYLAND, NEW YORK.

ACCELERATING DEVICE FOR MOTOR-CARS.

1,375,436. Specification of Letters Patent. Patented Apr. 19, 1921.

Application filed February 21, 1920. Serial No. 360,316.

*To all whom it may concern:*

Be it known that I, FAY J. YOUNG, a citizen of the United States, residing at Wayland, in the county of Steuben and State of New York, have invented certain new and useful Improvements in Accelerating Devices for Motor-Cars, of which the following is a specification, reference being had to the accompanying drawings.

This invention relates to accelerators for motor cars, and particularly to accelerators for cars of the Ford type, wherein low speed and the reversing of the car is secured by pushing forward the clutch pedal or a reversing pedal.

The general object of my invention is the provision of accelerating mechanism so constructed that the throttle will be caused to open upon the pushing forward of the low speed clutch pedal or the pushing forward of the reversing clutch pedal.

And a further object is to provide a mechanism of this character in which the accelerator may be operated by an accelerator pedal as well as operated automatically by the reverse and low speed clutch pedals.

Another object is to provide a device of this character which may be applied to a car without changing the ordinary mechanism thereof, and which will permit the throttle to be operated by means of the usual throttle controlling lever mounted upon the steering wheel.

Other objects will appear in the course of the following description.

My invention is illustrated in the accompanying drawings, wherein:—

Figure 1 is a perspective view of my attachment;

Fig. 2 is a plan view of the yoke connecting the throttle operating shaft to the throttle operating rod.

Referring to these drawings, A designates the top of the usual transmission case of an automobile of the character described, B indicates the low speed clutch pedal, and C a reverse clutch pedal. My device comprises a transverse rock shaft 10 which is mounted in angular brackets 11, which in turn are engaged with the cover of the transmission gear case. Carried upon one end of this shaft 10 is a crank arm 12 which may be adjusted in any suitable manner by means of the set screw 13, and this arm carries upon it the connecting rod 14 which, at its extremity, is connected to an angular arm 15 mounted upon a bracket 16 attached to any suitable part of the mechanism, this angular arm 15 being twisted so that its forward extremity lies in a vertical plane, and bifurcated at 17. This bifurcated arm embraces the transversely extending rod D usually used for oscillating the throttle valve controlling arm E which is connected to the throttle valve in the usual manner, and which is urged in one direction by means of a spring F. These parts are commonly found on automobile engines and require no special description. The rod D carries upon it a collar 18 with which the forked arm 17 engages, this collar being adjustable along the rod and set in any position by means of a set screw.

Mounted upon the shaft 10 and adjustable around the shaft are the two arms 19 and 20. These arms have collars which embrace the shaft 10 and the arms are held in any adjusted position on the shaft 10 by means of set screws 21. The extremities of these arms carry rollers 22 which bear against the forward edge faces of the pedals B and C respectively. It will thus be obvious that the depression of either one of the pedals B or C will cause the depression of the corresponding arm 19 or 20 and this will cause the shaft 10 to rock and will cause the rod D to be shifted in a direction to open the throttle valve.

Also mounted upon the rock shaft 10 is an arm 23 adjustable around the rock shaft by means of a set screw, and this arm is engaged by a pedal rod 24 which extends up through the foot board of the automobile and is provided at its end with a screw-threaded foot plate 25 which may be detached from the rod so as to permit the removal of the parts and the withdrawal of the rod 24 through the perforation in the foot board. Also mounted on the shaft 10 is an adjustable arm 26 which may be connected to any of the usual accelerating devices.

In order to permit the operation of the rod D by means of the usual accelerator lever on the steering wheel of the automobile without affecting the lever 15 and permit the operation of the rod D without affecting the lever on the steering wheel of the automobile, I provide the longitudinally slotted member 27, and the angular end 28 of the rod D extends up into the slot of this member, it being held in this position by a washer and cotter pin or any other suitable means. This slotted member 27 has an ear 29 at one side to which the crank arm 30 on the throttle controlling shaft 31 is mounted. This throttle controlling shaft, of course, extends up parallel to the steering post and is mounted in connection with the steering wheel. It is obvious that when this shaft 31 is moved in a counter-clockwise direction, the rod D will cause the opening of the throttle, and it is also obvious that when the shaft 10 is rotated in a counter-clockwise direction, the lever 15 will open the throttle.

By the mechanism above described, the throttle is automatically opened to give the engine more gas whenever the low speed clutch of the machine is thrown forward, and when this low speed clutch is released, the amount of gas is reduced. The same is true of the reversing clutch, as when this is thrown forward, the engine is given more gas automatically. At the same time, the engine may be accelerated either by the foot accelerator or by the throttle controlling lever on the steering wheel. It will be seen that the arms 19 and 20 may be adjusted so as to give any desired amount of opening to the throttle upon the depression of the low speed pedal or the reverse pedal. With this mechanism it is not necessary to operate the gas lever on the steering wheel or use the foot accelerator in order to back up or to go ahead. The operation of the low speed and reverse pedals automatically speeds up the motor, and with my mechanism the motor cannot be stalled by the operator having to feed gas to the motor at the time he goes into low speed or reverse.

It will be seen that this mechanism may be placed on the car without any alteration in the structure thereof, except the boring of a small hole through the foot board for the accelerator rod 24. My mechanism requires, therefore, no separate action in order to give the engine the proper amount of gas when the car is to be driven at low speed or reverse.

While I have illustrated a particular form of my invention, I do not wish to be limited thereto, as it is obvious that many changes might be made therein without departing from the spirit of the invention as defined in the appended claims.

I claim:—

1. In a motor car, the combination with a speed controlling pedal and a throttle valve, of a shaft extending in front of said pedal and having thereon an outwardly extending arm operatively engaged by the edge face of the pedal whereby the shaft will be rocked by a depression of the pedal, operative connections between said rock shaft and the throttle valve to cause the opening of the throttle valve upon a rocking of the shaft in one direction, and an independent accelerator pedal operatively connected to said shaft and including an arm adjustably mounted upon the shaft, a rod pivotally connected to said arm, and a pedal plate detachably engaging the outer end of the rod.

2. The combination with a motor car having a low speed and reverse pedals, a throttle valve having an arm, a transversely extending rod pivotally connected to the arm, a spring urging the throttle valve to a closed position, and a shaft having a crank arm at its end, of a longitudinally slotted member with which the crank arm engages, one end of the rod extending into said slot whereby the rod may have free movement in the slot in one direction without affecting said crank arm and shaft, but a movement of the crank arm and shaft will cause a shifting of the rod to open the throttle, a transverse shaft mounted in front of the said pedals and having rearwardly projecting arms with which the pedals respectively engage to rock the shaft when the pedals are depressed, an accelerator pedal operatively engaging said shaft, a pivotally supported angular lever loosely embracing the rod, a stop causing coincident movement of the lever and rod upon a movement of the lever in one direction to open the throttle, a crank arm on said transverse shaft, and a connection between said angular lever and the crank arm.

3. An accelerating mechanism for motor cars including supporting members adapted to be attached to a motor car and having bearings, a transverse shaft mounted in said bearings and adapted to be disposed in front of the low speed and reversing pedals thereof, arms mounted on said shaft for adjustment therearound and having rollers at their extremities adapted to be engaged by said pedals upon a depression thereof, a third arm adjustably mounted upon the shaft and having an accelerator pedal operatively connected thereto, a crank arm mounted in one end of the shaft, a connecting rod extending therefrom, a bracket adapted to be attached to a part of the motor car, an angular lever mounted upon said bracket and connected to the connecting rod, said angular lever being slotted at its extremity to embrace the throttle operating rod of the car.

In testimony whereof I hereunto affix my signature.

FAY J. YOUNG.